(12) United States Patent
Celozzi et al.

(10) Patent No.: US 12,714,014 B2
(45) Date of Patent: Aug. 25, 2026

(54) DETECTION OF A SOLAR PANEL FOR A ROBOTIC WORK TOOL

(71) Applicant: HUSQVARNA AB, Huskvarna (SE)

(72) Inventors: Carmine Celozzi, Jonkoping (SE); Jonas Hejderup, Boras (SE); Kamila Kowalska, Mullsjo (SE); Adam Ottvar, Gothenburg (SE); Jonathan Andersson, Jonkoping (SE); Peter Svenningsson, Gothenburg (SE)

(73) Assignee: HUSQVARNA AB, Huskvarna (SE)

( * ) Notice: Subject to any disclaimer, the term of this patent is extended or adjusted under 35 U.S.C. 154(b) by 149 days.

(21) Appl. No.: 18/526,633

(22) Filed: Dec. 1, 2023

(65) Prior Publication Data

US 2024/0180072 A1 Jun. 6, 2024

(30) Foreign Application Priority Data

Dec. 5, 2022 (SE) .................................... 2251415-2

(51) Int. Cl.
*A01D 34/00* (2006.01)
*A01D 101/00* (2006.01)
(Continued)

(52) U.S. Cl.
CPC ........... *A01D 34/008* (2013.01); *G05D 1/244* (2024.01); *A01D 2101/00* (2013.01); *G05D 2107/23* (2024.01)

(58) Field of Classification Search
CPC .............. A01D 34/008; A01D 2101/00; A01D 34/006; A01D 34/863; G05D 1/244;
(Continued)

(56) References Cited

U.S. PATENT DOCUMENTS 11,199,853 B1 12/2021 Afrouzi et al.
11,582,903 B1 * 2/2023 Brown .................. B60W 40/02
(Continued)

FOREIGN PATENT DOCUMENTS

AU 2021218647 A1 8/2022
EP 2336719 A2 6/2011
(Continued)

OTHER PUBLICATIONS

Search Report and Office Action for Swedish Application No. 2251415-2 mailed Jun. 19, 2023.

*Primary Examiner* — Brandon D Lee
(74) *Attorney, Agent, or Firm* — Burr & Forman

(57) ABSTRACT

A method for use in a robotic work tool system (200) comprising a robotic work tool (100) arranged to operate in an operational area (205) comprising one or more solar panels (10) each solar panel (10) having a panel (11) and one or more poles (12) connected to the panel (11) through a supporting structure (13), the operational area (205) having a surface that is at least partially irregular, and the robotic work tool comprising a memory (120) configured to store supporting structure geometry data, an image sensor (185), wherein the method comprises:

receiving an image from the image sensor (185) detecting a pole (12) in the image and determining a scale based on the determined height of the detected pole (12), wherein the pole (12) is detected based on the stored supporting structure geometry data.

17 Claims, 4 Drawing Sheets

(51) Int. Cl.
*G05D 1/244* (2024.01)
*G05D 107/20* (2024.01)

(58) Field of Classification Search
CPC ............... G05D 2107/23; G05D 1/246; G05D 2105/15; G05D 2107/75; G05D 2109/10; G05D 1/243; G05D 1/622; G05D 1/24; G05D 1/43; H02S 10/40; G06T 7/00
See application file for complete search history.

(56) References Cited

U.S. PATENT DOCUMENTS

| | | | | |
|---|---|---|---|---|
| 11,951,977 | B1 * | 4/2024 | Blanton | G01S 17/04 |
| 2016/0344330 | A1 * | 11/2016 | Gillis | H02S 20/32 |
| 2020/0159229 | A1 | 5/2020 | Horesh et al. | |
| 2020/0225673 | A1 | 7/2020 | Ebrahimi et al. | |
| 2020/0380316 | A1 * | 12/2020 | Lee | G06T 7/62 |
| 2021/0061306 | A1 * | 3/2021 | Dagan | H04W 4/40 |
| 2023/0270043 | A1 * | 8/2023 | Dugas | A01D 41/127 56/10.2 E |

FOREIGN PATENT DOCUMENTS

| | | | |
|---|---|---|---|
| EP | 2884364 | A1 | 6/2015 |
| EP | 3591838 | A1 | 1/2020 |

* cited by examiner

DETECTION OF A SOLAR PANEL FOR A ROBOTIC WORK TOOL

TECHNICAL FIELD

This application relates to a robotic work tool, such as a lawnmower, and a method for providing an improved detection of a solar panel for the robotic work tool, and in particular to a robotic work tool, such as a lawnmower, and a method for providing an improved detection of a solar panel for the robotic work tool utilizing a camera, and in particular to using a mono-camera.

BACKGROUND

Automated or robotic work tools such as robotic lawnmowers are becoming increasingly more popular and so is the use of the robotic work tool in various types of operational areas. Such operational areas, in particular for robotic work tools being robotic lawnmowers, sometimes include solar panels. Some designs for solar panels is a panel with solar cells that is carried by poles. As solar panels cover a large area and are above ground, there are problems with maintaining the area under them, for example the grass.

The large area covered makes the solar panel fields unsuitable or impractical for being bounded by a magnetic boundary wire.

The large area covered also makes satellite navigation prone to error, as the robotic work tool will be operating under the panels and thus oftentimes experience blocked satellite reception. At the same time, accurate navigation is important to avoid the robotic work tool from colliding repeatedly with the various poles in the solar panel field which can damage both the robotic work tool and the solar panels. This is especially true as due to the large area of the solar panel fields, large robotic work tools are preferably utilized which carries a lot of weight and momentum.

The large areas also often include irregular surfaces, such as slopes, and hidden objects such as roots or debris in the grass to be cut.

Utilizing navigation techniques relying on odometry such as through deduced reckoning in such irregular areas suffer from drawbacks in such irregular areas, as the assumptions made in various odometry-based navigation techniques are based on a flat operating surface. Furthermore navigation techniques relying on visual odometry, such as for Visual Simultaneous Localization and Mapping (V-SLAM), also suffer from drawbacks in that advanced cameras are needed for establishing a scale of an observed area as without a proper scale, the interpretation is difficult to match to a map. Without a scale the robotic work tool also runs a higher risk of colliding with poles even if detected as it will be difficult to properly determine the distance to the pole. Such advanced cameras increase the cost of the robotic work tool.

Thus, there is a need for an improved manner of detecting poles for solar panels and for providing advanced navigational functionality utilizing cheap or uncomplicated sensors.

SUMMARY

It is therefore an object of the teachings of this application to overcome or at least reduce those problems by providing a robotic work tool system comprising a robotic work tool arranged to operate in an operational area comprising one or more solar panels, each solar panel having a panel and one or more poles connected to the panel through a supporting structure, the operational area having a surface that is at least partially irregular, and the robotic work tool comprising a controller, a memory configured to store supporting structure geometry data, an image sensor, wherein the controller is configured to:

receive an image from the image sensor, detect a pole in the image, determine a height of the detected pole, and determine a scale based on the determined height of the detected pole, wherein the pole is detected based on the stored supporting structure geometry data.

In some embodiments the controller is further configured to determine that the detected pole is a solar panel pole based on the stored geometry data, wherein the stored geometry data includes asymmetrical features.

In some embodiments the stored geometry data includes an angle (alpha) between a pole and a panel.

In some embodiments the controller is further configured to determine that the detected pole is a front pole or a rear pole by determining a distance to an edge of the panel In some embodiments the controller is further configured to determine that the detected pole is a front pole if the pole is closest to an edge at a lower side and determine that the detected pole is a rear pole if the pole is closest to an edge at a higher side.

In some embodiments the stored geometry data includes a distance to an edge of the panel.

In some embodiments the controller is further configured to determine the scale by detecting the supporting structure of the pole, determining a height of the detected pole, determining a height of the detected supporting structure, and determining the scale based on a ratio between these determined heights to known heights of the pole and the supporting structure, wherein the supporting structure geometry data includes heights of pole(s) and supporting structure(s).

In some embodiments the controller is further configured to determine a distance from the robotic work tool to the pole based on the scale.

In some embodiments the controller is further configured to navigate based on the determined distance.

In some embodiments the memory is further configured to store a location of a pole and wherein the controller is further configured to determine a position (P) of the robotic work tool and to determine the distance to a detected pole, determine an expected distance, determine that the determined distance corresponds to the expected distance and in response thereto determine that the position (P) of the robotic work tool is correct.

In some embodiments the controller is further configured to determine a ground level by extrapolating the pole.

In some embodiments the controller is further configured to adapt a speed of the robotic work tool in response to detecting the pole.

In some embodiments the controller is further configured to adapt a speed of a work tool of the robotic work tool in response to detecting the pole.

In some embodiments the robotic work tool is a robotic lawnmower.

It is also an object of the teachings of this application to overcome the problems by providing a method for use in a robotic work tool system comprising a robotic work tool arranged to operate in an operational area comprising one or more solar panels each solar panel having a panel and one or more poles connected to the panel through a supporting structure, the operational area having a surface that is at least partially irregular, and the robotic work tool comprising a memory configured to store supporting structure geometry data, an image sensor, wherein the method comprises: receiving an image from the image sensor, detecting a pole in the image, determining a height of the detected pole, and determining a scale based on the determined height of the detected pole, wherein the pole is detected based on the stored supporting structure geometry data.

It is also an object of the teachings of this application to overcome the problems by providing a computer-readable medium carrying computer instructions that when loaded into and executed by a controller of a robotic work tool enables the robotic work tool to implement the method according to herein.

Further embodiments and aspects are as in the attached patent claims and as discussed in the detailed description.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein. Like reference numbers refer to like elements throughout.

It should be noted that even though the description given herein will be focused on robotic lawnmowers, the teachings herein may also be applied to, robotic watering tools, robotic golf ball collectors, and robotic mulchers to mention a few examples.

Figure 1A:
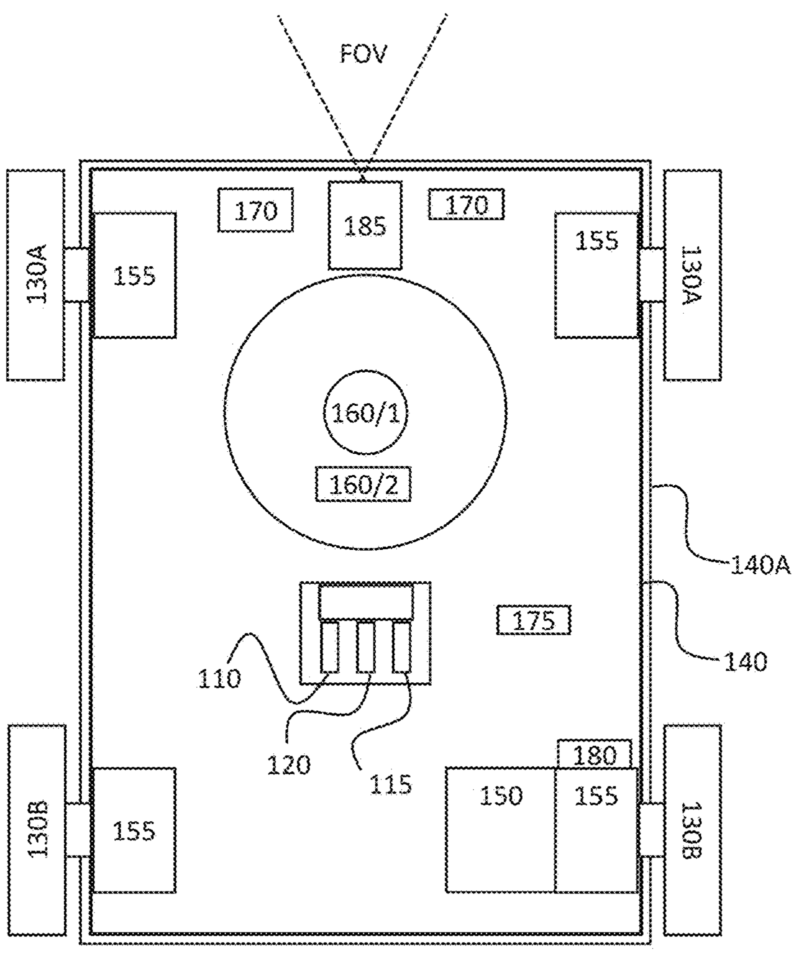
FIG. 1A shows a schematic view of the components of an example of a robotic work tool being a robotic lawnmower according to some example embodiments of the teachings herein.

FIG. 1A shows a schematic overview of a robotic work tool 100, here exemplified by a robotic lawnmower 100. The robotic work tool 100 may be a multi-chassis type or a mono-chassis type (as in FIG. 1A). A multi-chassis type comprises more than one main body parts that are movable with respect to one another. A mono-chassis type comprises only one main body part.

It should be noted that robotic lawnmower may be of different sizes, where the size ranges from merely a few decimetres for small garden robots, to even more than 2 meters for large robots arranged to service for example airfields or solar panel fields.

It should be noted that even though the description herein is focused on the example of a robotic lawnmower, the teachings may equally be applied to other types of robotic work tools, such as robotic watering tools, robotic golf ball collectors, and robotic mulchers to mention a few examples.

In some embodiments, and as will be discussed below, the robotic work tool is a semi-controlled or at least supervised autonomous work tool, such as farming equipment or large lawnmowers, for example riders or comprising tractors being autonomously controlled.

It should also be noted that the robotic work tool is a self-propelled robotic work tool, capable of autonomous navigation within an operational area, where the robotic work tool propels itself across or around the operational area in a pattern (random or predetermined).

The robotic work tool 100, exemplified as a robotic lawnmower 100, has a main body part 140, possibly comprising a chassis 140 and an outer shell 140A, and a plurality of wheels 130 (in this example four wheels 130, but other number of wheels are also possible, such as three or six).

The main body part 140 substantially houses all components of the robotic lawnmower 100. At least some of the wheels 130 are drivably connected to at least one electric motor 155 powered by a battery 150. It should be noted that even if the description herein is focused on electric motors, combustion engines may alternatively be used, possibly in combination with an electric motor. In the example of FIG. 1, each of the wheels 130 is connected to a common or to a respective electric motor 155 for driving the wheels 130 to navigate the robotic lawnmower 100 in different manners. The wheels, the motor 155 and possibly the battery 150 are thus examples of components making up a propulsion device. By controlling the motors 155, the propulsion device may be controlled to propel the robotic lawnmower 100 in a desired manner, and the propulsion device will therefore be seen as synonymous with the motor(s) 150. It should be noted that wheels 130 driven by electric motors is only one example of a propulsion system and other variants are possible such as caterpillar tracks.

The robotic lawnmower 100 also comprises a controller 110 and a computer readable storage medium or memory 120. The controller 110 may be implemented using instructions that enable hardware functionality, for example, by using executable computer program instructions in a general-purpose or special-purpose processor that may be stored on the memory 120 to be executed by such a processor. The controller 110 is configured to read instructions from the memory 120 and execute these instructions to control the operation of the robotic lawnmower 100 including, but not being limited to, the propulsion and navigation of the robotic lawnmower.

The controller 110 in combination with the electric motor 155 and the wheels 130 forms the base of a navigation system (possibly comprising further components) for the robotic lawnmower, enabling it to be self-propelled as discussed.

The controller 110 may be implemented using any suitable, available processor or Programmable Logic Circuit (PLC). The memory 120 may be implemented using any commonly known technology for computer-readable memories such as ROM, FLASH, DDR, or some other memory technology.

The robotic lawnmower 100 is further arranged with a wireless communication interface 115 for communicating with other devices, such as a server, a personal computer, a smartphone, the charging station, and/or other robotic work tools. Examples of such wireless communication devices are Bluetooth®, WiFi® (IEEE802.11b), Global System Mobile (GSM) and LTE (Long Term Evolution), to name a few. The robotic lawnmower 100 may be arranged to communicate with a user equipment (not shown but will be regarded as being an example of a server, as an example of a connected device) as discussed in relation to FIG. 2 below for providing information regarding status, location, and progress of operation to the user equipment as well as receiving commands or settings from the user equipment. Alternatively or additionally, the robotic lawnmower 100 may be arranged to communicate with a server (referenced 240 in FIG. 2) for providing information regarding status, location, and progress of operation as well as receiving commands or settings.

The robotic lawnmower 100 also comprises a work tool 160, which in the example of the robotic lawnmower 100 is a grass cutting device 160, such as a rotating blade 160/2 driven by a cutter motor 160/1.

For enabling the robotic lawnmower 100 to navigate with reference to a wire, such as a boundary wire or a guide wire, emitting a magnetic field caused by a control signal transmitted through the wire, the robotic lawnmower 100 is, in some embodiments, configured to have at least one magnetic field sensor 170 arranged to detect the magnetic field and for detecting the wire and/or for receiving (and possibly also sending) information to/from a signal generator. In some embodiments, such a magnetic boundary is used to provide a border (not shown explicitly in FIG. 2 but deemed to be included in the boundary 220) enclosing an operational area (referenced 205 in FIG. 2).

In some embodiments the robotic lawnmower 100 comprises a satellite signal navigation sensor 175 configured to provide navigational information (such as position) based on receiving one or more signals from a satellite—possibly in combination with receiving a signal from a base station. In some embodiments the satellite navigation sensor is a GPS (Global Positioning System) device or other Global Navigation Satellite System (GNSS) device. In some embodiments the satellite navigation sensor 175 is a RTK sensor. This enables the robotic work tool to operate in an operational area bounded by a virtual border (not shown explicitly in FIG. 2 but deemed to be included in the boundary 220).

In some embodiments, the robotic lawnmower 100 also comprises deduced reckoning sensors 180. The deduced reckoning sensors may be odometers, accelerometers or other deduced reckoning sensors. In some embodiments, the robotic work tool comprises a visual odometry sensor, possibly comprised in or connected to the deduced reckoning sensors 180.

In some embodiments, the deduced reckoning sensors are comprised in the propulsion device, wherein a deduced reckoning navigation may be provided by knowing the current supplied to a motor and the time the current is supplied, which will give an indication of the speed and thereby distance for the corresponding wheel.

The deduced reckoning sensors 180, especially in combination with the visual odometry sensor, enables the robotic work tool to operate according to a map of the operational area. In some such embodiments, the navigation is based on SLAM, and in some embodiments, where a visual odometry sensor (such as a camera) is utilized, the navigation is based on V-SLAM.

The robotic work tool 100 also comprises an image sensor, such as a camera or other sensor configured to provide data on which image analysis can be performed. In some embodiments the camera 185 is a mono-camera 185, wherein mono relates to a camera having a single Field-Of-View (FOV) in contrast to a stereo camera. Such mono cameras have the benefit of being cheap although unable to provide scale or distance.

The robotic lawnmower 100 is in some embodiments arranged to operate according to a map application (indicated in FIG. 2 and referenced 120A) representing one or more operational areas (and possibly the surroundings of the operational area(s)) as well as features of the operational area(s) stored in the memory 120 of the robotic lawnmower 100. In some embodiments, the map is also or alternatively stored in the memory of a server (referenced 240 in FIG. 2). The map application may be generated or supplemented as the robotic lawnmower 100 operates or otherwise moves around in the operational area. In some embodiments, the map application is downloaded, possibly from the server. In some embodiments, the map application also includes one or more transport areas. The robotic work tool 100 is arranged to navigate according to the map based on the deduced reckoning sensors 180.

In some embodiments the robotic work tool is arranged or configured to traverse and operate in operational areas that are not essentially flat, but contain terrain that is of varying altitude, such as undulating, comprising hills or slopes or such. The ground of such terrain is not flat and it is not straightforward how to determine an angle between a sensor mounted on the robotic work tool and the ground. The robotic work tool is also or alternatively arranged or configured to traverse and operate in an operational area that contains obstacles that are not easily discerned from the ground. Examples of such are grass or moss-covered rocks, roots or other obstacles that are close to ground and of a similar colour or texture as the ground. The robotic work tool is also or alternatively arranged or configured to traverse and operate in an operational area that contains obstacles that are overhanging, i.e. obstacles that may not be detectable from the ground up, such as low hanging branches of trees or bushes. Such a garden is thus not simply a flat lawn to be mowed or similar, but an operational area of unpredictable structure and characteristics. The operational area exemplified with referenced to FIG. 2, may thus be such a non-uniform operational area as disclosed in this paragraph that the robotic work tool is arranged to traverse and/or operate in.

Figure 1B:
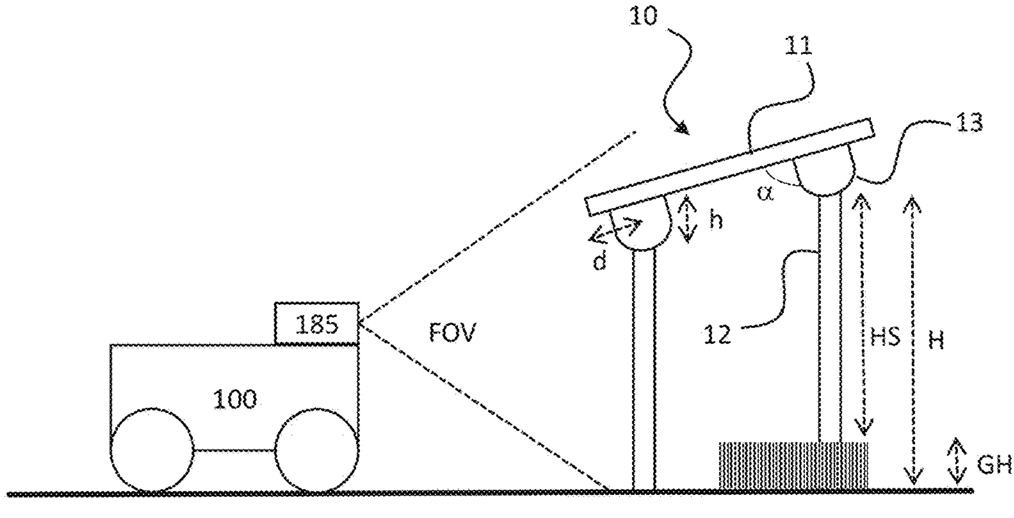
FIG. 1B shows a schematic side-view of an example of a robotic work tool operating on a flat surface detecting a solar panel.

FIG. 1B shows a situation where the robotic work tool 100 is navigating a (flat) surface of an operational area utilizing the camera 185. In this example the camera will be assumed to be a mono camera.

In the area where the robotic work tool 100 is operating there is also shown a solar panel 10. It should be noted that all figures herein are of a schematic nature and not drawn to scale.

The solar panel has a panel 11 which is arranged with solar cells and which panel is supported by poles 12 or other supporting structures. As FIG. 1B is a side-view only two poles 12 are shown, but it should be noted that any number of poles is possible and depends on the design of the solar panel 10.

The pole 12 connects to the panel 11 through a connecting structure 13. The exact design of a connecting structure can be made in many different manners and depends on the design of the solar panel, but in common for most designs is—as the inventors have realized—that they are not symmetrical in all (viewing) angles.

The panel 11 of the example illustrated in FIG. 1B is also arranged at an angle alpha (α) which also leads to that the poles are not symmetrically (or identically) attached to the panel through the supporting structures 13. Also, the poles may be of different length as is illustrated in FIG. 1B. This introduces a further problem with solar panel detection in that the length of a pole may be unknown as parts of the pole 12 may be covered by grass and it will thus be difficult to perform accurate height determinations of a pole. The height determination may serve to provide a scale and/or to determine if a detected pole is a pole at the front (lower end) of a solar panel 10 or at the rear (higher end) of the solar panel 11.

However, as the inventors have realized, by utilizing the unsymmetrical property of the supporting structure 13, possibly including the angle alpha of the solar panel, it is possible to determine if the pole is a front pole or a rear pole. This can be used to determine the scale of an image which can provide important navigational data—such as the distance to the pole.

Figure 2:
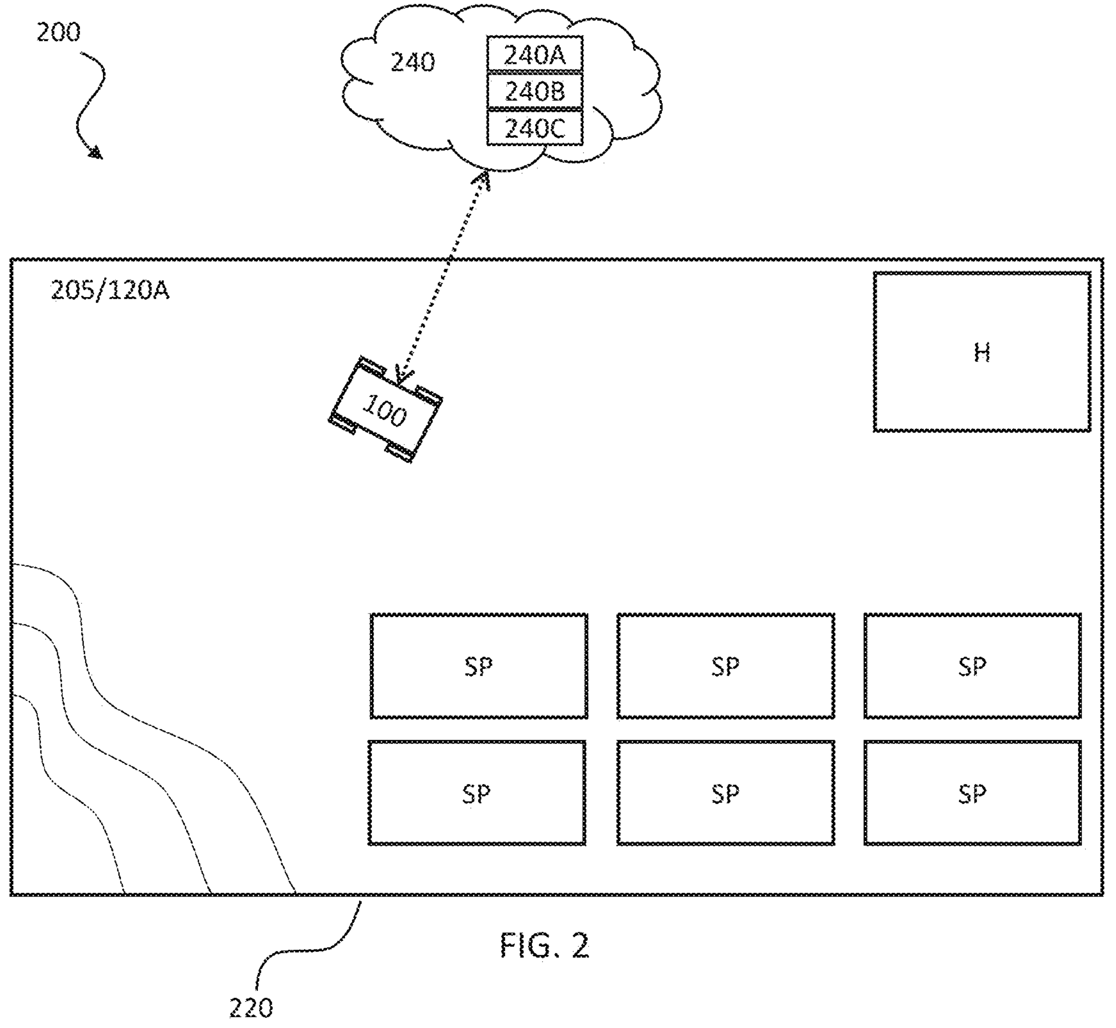
FIG. 2 shows a schematic view of a robotic work tool system according to some example embodiments of the teachings herein.

FIG. 2 shows a robotic work tool system 200 in some embodiments. The schematic view is not to scale. The robotic work tool system 200 comprises one or more robotic work tools 100 according to the teachings herein arranged to operate in one or more operational areas 205 possibly bounded by a boundary 220. It should be noted that the operational area 205 shown in FIG. 2 is simplified for illustrative purposes.

The view of the operational area 205 is also intended to be an illustration or graphical representation of the map application 120A discussed in the above.

A server 240 is shown as an optional connected device for the robotic work tool 100 to communicate with—possibly for receiving maps or map updates. The server 240 comprises a controller 240A for controlling the operation of the server 240, a memory 240B for storing instructions and data relating to the operation of the server 240 and a communication interface 240C for enabling the server 240 to communicate with other entities, such as the robotic work tool 100, and/or a User Equipment such as a mobile phone. The controller, the memory and the communication interface may be of similar types as discussed in relation to FIG. 1 for the robotic work tool 100.

As with FIG. 1, the robotic work tool(s) is exemplified by a robotic lawnmower, whereby the robotic work tool system may be a robotic lawnmower system or a system comprising a combinations of robotic work tools, one being a robotic lawnmower, but the teachings herein may also be applied to other robotic work tools adapted to operate within an operational area.

As is shown in FIG. 2 there may be obstacles such as houses, structures, trees to mention a few examples in the operational area 205. In FIG. 2 such obstacles are indicated and referenced H (as in house). There may also be one or more irregularities in the surface of the operational area, which are exemplified in FIG. 2 as a slope S. The operational area may also comprise one or more solar panels SP. As discussed in the background section such solar panels often cover a large area where satellite navigation will be difficult. Also, as the solar panels will block the sun intermittently, the area under the panels is also in a tricky lighting environment making traditional image analysis difficult as there will be many situations where unwanted shadows or backlighting provides images of low quality.

The inventors have realized that by knowing—at least certain features of—the geometry of the solar panel 10 and especially the supporting structure 13 it is possible to not only detect a pole but to determine that the detected pole is indeed for a solar panel and also, which of the poles (front or rear, and also possible left or right, middle) of the solar panel 10 that has been detected.

In some embodiments the robotic work tool 100 is configured to capture an image utilizing the camera 185 and perform image analysis on the image. The image may be a single image or it may be a stream of images, such as video or a series of images taken at (ir)regular intervals. Based on the image the robotic work tool detects a pole 12. The pole 12 may be detected based on the general shape of a pole. In some embodiments the pole 12 is detected based on the geometry of the supporting structure 13. In such embodiments the memory 120 is thus configured to store data on the geometry of the supporting structure.

In some embodiments the geometry includes the angle alpha between the panel 11 and the pole 12. Based on the geometry including the angle alpha the robotic work tool 100 is enabled to determine that the pole 12 is indeed a pole for a solar panel 10, and not for a table as a tabletop will not be at an angle relative the legs.

In some embodiments the geometry of the supporting structure 13 also includes a distance d from the edge of the panel to the supporting structure 13. In some such embodiments the distance d is the distance to the closest edge (front, rear). In some such embodiments the distance d is the distance(s) to more than one edge (front, rear and/or side edge).

Determining the distance d—at least approximately—to the closest edge enables the robotic work tool 100 to determine if the detected pole 12 is at a front edge of the panel 11 or at a rear edge of the panel 11. In some embodiments determining the distance includes determining which side is closest to an edge of the panel 11. If the closest edge is at the lower side, the pole is a front pole. If the closest edge is at the higher side, the pole is a rear pole.

In some embodiments the robotic work tool 100 is configured to store data on heights for poles, and specifically the height for the front pole(s) and the height for the rear pole(s). Knowing the height of the pole, the robotic work tool 100 is enabled to determine a scale for the image. The scale is determined based on a comparison of a determined height of the pole in the image and the known height for the pole. The robotic work tool 100 is thus enabled to determine the scale by determining a height of the detected pole and comparing it with a known height for the pole.

However, in many situations a portion of the pole 12 is hidden or obscured by grass, as is shown in FIG. 1B. In FIG. 1B only a portion of the pole 12 is visible indicating a height HS (Height Seen), whereas portion is hidden, being of a height GH (grass height). The scale determination in such situations risk being inaccurate if the seen height HS is compared instead of the actual height H.

In some embodiments the geometry of the supporting structure 13 also includes a height h of the supporting structure 13. By knowing the height h of the supporting structure 13 (which will most likely never be hidden by grass as it is in a protected position under the panel 11) the robotic work tool is enabled to determine just how much is hidden of the pole 12 in the image.

By comparing the known height h to a determined height of the supporting structure the scale can be determined directly. However, in some situations the image may be of too bad a quality to make such determinations accurately, especially as the image may be taken at an angle distorting distances. However, by determining the ratio between the known height h of the supporting structure 13 and the known height H of the pole 12 and comparing this to the ratio between the height of the determined pole 12 and the height of the determined supporting structure 13, the height of the determined pole can be extrapolated to not only determine the height of the pole for determining a scale, but also to determine the ground level.

In some embodiments the robotic work tool 100 is thus configured to determine a height of the determined pole 12 and a height of the determined supporting structure 13, and to compare the ratio between these determined heights to the known heights of the pole 12 and the supporting structure 13. Based on this the robotic work tool 100 can determine a scale, which can be utilized to determine a distance from the robotic work tool 100 to the pole 12. Based on this the robotic work tool 100 can also or alternatively determine a ground level by extrapolating (the height of) the pole 12.

In some embodiments where the geometry of the supporting structure is known in detail as regards the dimensions of the supporting structure 13 the robotic work tool 100 is enabled to determine an angle at which (the image of) the supporting structure 13 has been captured and based on this image angle the robotic work tool 100 is enabled to compare the known height h to a determined height of the supporting structure directly to determine the scale by adapting the determined height based on the determined image angle.

This image angle can be determined based on a (visual) comparison between the stored geometry of the supporting structure and the image of the supporting structure 13.

In some embodiments a detailed image analysis enables for not only detecting the supporting structure but also to determine from what angle the image is taken and whether the supporting structure is for a front or rear (or middle) pole. This can be done by image matching of the taken image with stored image data of one or more supporting structures 13.

The image analysis can also be utilized to identify the type of supporting structure and thereby to identify the type of solar panel, which will enable the robotic work tool to determine (such as through a remote or local memory lookup) the dimensions of the solar panel 10.

By knowing the distance to a pole 12, and by knowing if the pole 12 is a front or a rear (or middle) pole 12, and by knowing the location of such poles 12, the robotic work tool is enabled to navigate in the operational area 205 based on such distance determinations. This enables for a more accurate navigation even in the areas (as in under the panels 11) where satellite navigation may be blocked.

Figure 3:
FIG. 3 shows a schematic view of a robotic work tool system according to some example embodiments of the teachings herein.
Figure 3:
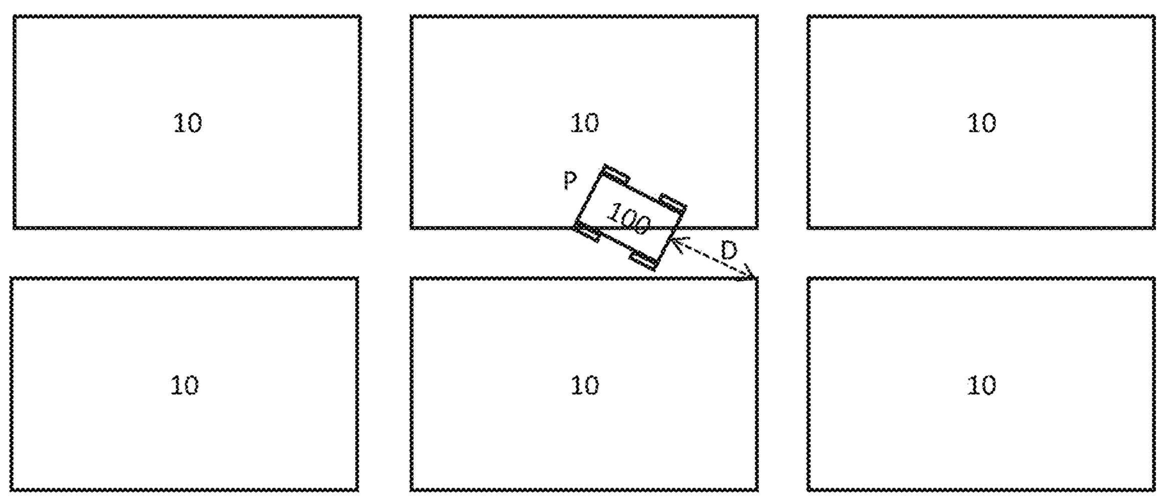

FIG. 3 shows a schematic view of a robotic work tool system 200 as in FIG. 2 where the robotic work tool 100 is deployed to operate in a solar panel field (or other area with solar panels) having several solar panels SP.

In some embodiments the robotic work tool 100 is enabled to determine a position P of the robotic work tool 100 through the use of a satellite navigation sensor 175. As a pole 12 (not explicitly shown in FIG. 3, but assumed to be at each corner of a solar panel 10 as in FIG. 1B) is detected, the robotic work tool can determine a distance D to the pole 12. The distance D can be determined in any manner as discussed in the above. As a skilled person would understand, the pole 12 may not be located exactly in the corners, but offset from the corners or even at other locations. Furthermore, there may in some solar panels be more or less than one leg per corner, for example only one mid-pole.

By knowing the location of the pole(s), for example by the locations of the poles being stored or part of the map application 120A, the robotic work tool can determine if the current position P is correct or not, such as when the current position is determined based on for example the satellite navigation sensor and/or the deduced reckoning sensor(s).

The robotic work tool 100 is thus in some embodiments configured to determine its (current) position P and to determine the distance D to a detected pole 12. The robotic work tool 100 is also configured to determine if the determined distance D corresponds to an expected distance. The expected distance is the distance from the determined position to the pole according to the known position of the pole, such as according to the map application 120A. If the determined distance D does not equal or correspond to (as being within a threshold distance), the current position P is incorrectly determined.

In some embodiments the current position P is corrected to be at the determined distance D to the detected pole.

By knowing the positions of several poles and by detecting several poles, the robotic work tool is also enabled in some embodiments to navigate based on the detection of the poles.

As stated above, the robotic work tool 100 is enabled to determine a distance to a pole 12. If the robotic work tool 100 is able to detect more than one pole 12, the orientation of the robotic work tool can also be determined based on the detected distances and the known locations of the poles 12. The known locations may be determine based on a map application or be determined based on the geometry of the solar panel.

In such embodiments the robotic work tool 100 is also configured to determine a direction to the detected pole(s) and navigate based on such detected directions and distances according to the known positions, such as according to the map.

In some embodiments such navigation is supplemented by deduce reckoning sensors 180.

As the inventors have realized, the grass under solar panels is usually badly maintained and may hide debris, irregularities or other situations that may damage or hinder the robotic work tool 100 in its operation. In order to safeguard against such hidden risks, the robotic work tool 100 is in some embodiments configured to adapt the speed of the robotic work tool 100 as a pole is detected. In some such embodiments the speed is adapted when a distance to the detected pole is determined to fall under a threshold distance—indicating that the robotic work tool 100 is about to enter in under the solar panel or into the solar panel field. In some embodiments the speed is adapted by being lowered, and in some such embodiments the speed is lowered to under 75%, under 50%, under 25% or any range there in between of the current speed.

In some embodiments, the robotic work tool 100 is further configured to adapt the rotating speed and/or rotation of the work tool 160. In some embodiments the rotating speed is adapted by being lowered, and in some such embodiments the rotating speed is lowered to under 75%, under 50%, under 25% or any range there in between of the current rotating speed. In some embodiments the rotating direction is adapted by being changed, and in some such embodiments the rotating direction is changed intermittently back and forth.

Figure 4:
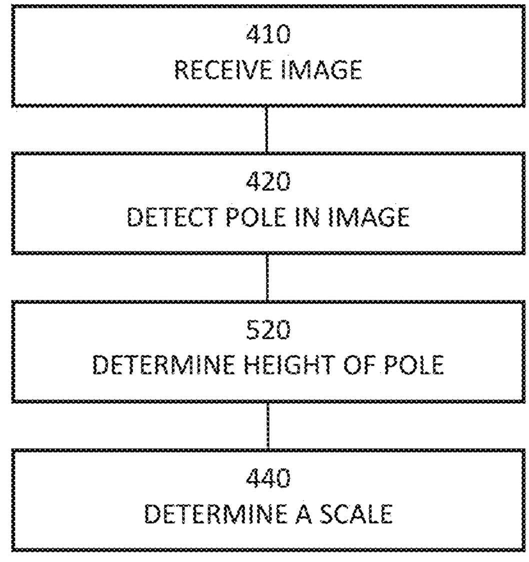
FIG. 4 shows a corresponding flowchart for a method according to some example embodiments of the teachings herein.

FIG. 4 shows a flowchart for a general method according to herein. The method is for use in a robotic work tool as in FIG. 1A in a manner as discussed above in relation to FIGS. 1B, 2, and 3.

The method comprises a controller of the robotic work tool system receiving 410 receiving an image from the image sensor 185, detecting 420 a pole (12) in the image, determining 430 a height of the detected pole (12), and determining 440 a scale based on the determined height of the detected pole (12), wherein the pole (12) is detected based on the stored supporting structure geometry data.

Figure 5:
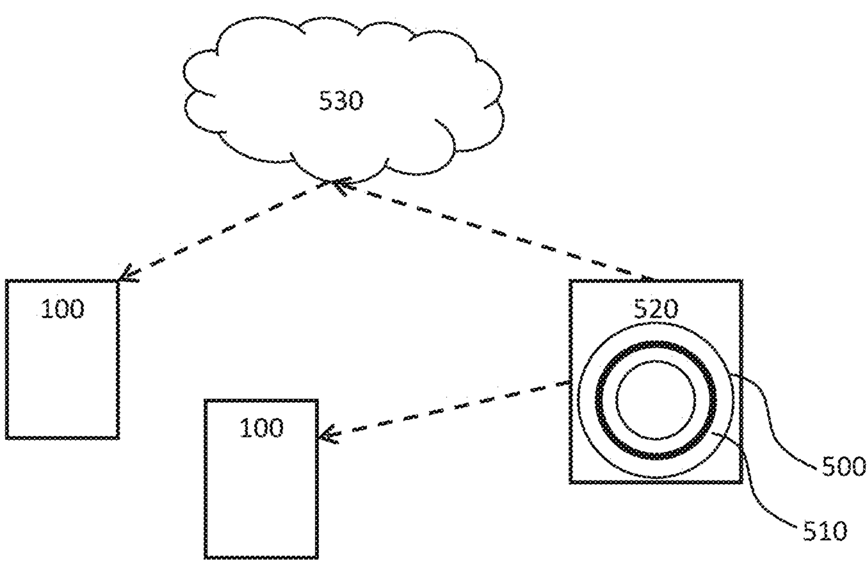
FIG. 5 shows a schematic view of a computer-readable medium carrying computer instructions that when loaded into and executed by a controller of a robotic work tool, enables the robotic work tool to implement the teachings herein.

FIG. 5 shows a schematic view of a computer-readable medium 500 carrying computer instructions 510 that when loaded into and executed by a controller of a device, such as a robotic work tool 100 or a server 240, enables the device to implement the teachings herein. In the example of FIG. 5, the device will be exemplified as the robotic work tool 100. The computer-readable medium 500 may be tangible such as a hard drive or a flash memory, for example a USB memory stick or a cloud server. Alternatively, the computer-readable medium 500 may be intangible such as a signal carrying the computer instructions enabling the computer instructions to be downloaded through a network connection, such as an internet connection. In the example of FIG. 5, a computer-readable medium 500 is shown as being a hard drive or computer disc 500 carrying computer-readable computer instructions 510, being inserted in a computer disc reader 520. The computer disc reader 520 may be part of a cloud server 530—or other server—or the computer disc reader 520 may be connected to a cloud server 530—or other server. The cloud server 530 may be part of the internet or at least connected to the internet. The cloud server 530 may alternatively be connected through a proprietary or dedicated connection.

In one example embodiment, the computer instructions are stored at a remote server 530 and be downloaded to the memory 120 of the robotic work tool 100 for being executed by the controller 110.

The computer disc reader 520 may also or alternatively be connected to (or possibly inserted into) a robotic work tool 100 for transferring the computer-readable computer instructions 510 to a controller of the robotic work tool 100 (presumably via a memory of the robotic work tool 100).

FIG. 5 shows both the situation when a robotic work tool 100 receives the computer-readable computer instructions 510 via a server connection and the situation when another robotic work tool 100 receives the computer-readable computer instructions 510 through a wired interface. This enables for computer-readable computer instructions 510 being downloaded into a robotic work tool 100 thereby enabling the robotic work tool 100 to operate according to and implement the invention as disclosed herein.

The invention claimed is:

1. A robotic work tool system comprising a robotic work tool configured to operate in an operational area comprising one or more solar panels each solar panel having a panel and one or more poles connected to the panel through a supporting structure, the operational area having a surface having at least one irregularity, and the robotic work tool comprising a controller, a memory configured to store supporting structure geometry data, an image sensor, wherein the controller is configured to:

receive an image from the image sensor, detect a pole of the one or more poles in the image, determine a height of the detected pole, detect the supporting structure of the pole, determining a height of the detected supporting structure, determine a scale based on the determined height of the detected pole, wherein the pole is detected based on the stored supporting structure geometry data based on the determined scale, adjust at least one of navigation of the robotic work tool or operation of a work tool carried by the robotic work tool, and wherein the controller is further configured to determine the scale based on a ratio between determined heights to known heights of the detected pole and the supporting structure.

2. The robotic work tool system according to claim 1, wherein the controller is further configured to determine that the detected pole is a solar panel pole based on the stored geometry data, wherein the stored geometry data includes asymmetrical features.

3. The robotic work tool system according to claim 2, wherein the stored geometry data includes an angle between a pole and a panel.

4. The robotic work tool system according to claim 1, wherein the controller is further configured to determine that the detected pole is a front pole or a rear pole by determining a distance to an edge of the panel.

5. The robotic work tool system according to claim 4, wherein the controller is further configured to determine that the detected pole is a front pole if the pole is closest to an edge at a lower side and determine that the detected pole is a rear pole if the pole is closest to an edge at a higher side.

6. The robotic work tool system according to claim 4, wherein the stored geometry data includes a distance to an edge of the panel.

7. The robotic work tool system according to claim 1, wherein the supporting structure geometry data includes heights of the pole and the supporting structure.

8. The robotic work tool system according to claim 1, wherein the controller is further configured to determine a distance from the robotic work tool to the pole based on the scale.

9. The robotic work tool system according to claim 8, wherein the controller is further configured to navigate based on the determined distance.

10. The robotic work tool system according to claim 9, wherein the memory is further configured to store a location of one or more poles and wherein the controller is further configured to determine a position of the robotic work tool and to determine the distance to a detected pole of the one or more poles, determine an expected distance, determine that the determined distance corresponds to the expected distance and in response thereto determine that the position of the robotic work tool is correct.

11. The robotic work tool system according to claim 1, wherein the controller is further configured to determine a ground level by extrapolating the pole.

12. The robotic work tool system according to claim 1, wherein the controller is further configured to adapt a speed of the robotic work tool in response to detecting the pole.

13. The robotic work tool system according to claim 1, wherein the controller is further configured to adapt a speed of a work tool of the robotic work tool in response to detecting the pole.

14. The robotic work tool system according to claim 1, wherein the robotic work tool is a robotic lawnmower.

15. The robotic work tool system according to claim 1, wherein the image sensor is a mono camera.

16. A method for use in a robotic work tool system comprising a robotic work tool configured to operate in an operational area comprising one or more solar panels each solar panel having a panel and one or more poles connected to the panel through a supporting structure, the operational area having a surface having at least one irregularity, and the robotic work tool comprising a memory configured to store supporting structure geometry data, an image sensor, wherein the method comprises:

receiving an image from the image sensor, detecting a pole of the one or more poles in the image, determining a height of the detected pole, detecting the supporting structure of the pole, determining a height of the detected supporting structure, determining a scale based on the determined height of the detected pole, wherein the detected pole is detected based on the stored supporting structure geometry data, and based on the determined scale, adjusting at least one of navigation of the robotic work tool or operation of a work tool carried by the robotic work tool, wherein determining the scale is further based on a ratio between determined heights to known heights of the detected pole and the supporting structure.

17. A non-transitory computer-readable medium storing instructions that when loaded into and executed by a controller of a robotic work tool enables the robotic work tool to implement the method according to claim 16.

* * * * *